US011437934B2

(12) United States Patent
Yamamoto et al.

(10) Patent No.: US 11,437,934 B2
(45) Date of Patent: Sep. 6, 2022

(54) VIBRATION WAVE MOTOR AND DRIVING DEVICE INCLUDING THE VIBRATION WAVE MOTOR

(71) Applicant: CANON KABUSHIKI KAISHA, Tokyo (JP)

(72) Inventors: Yasufumi Yamamoto, Kawasaki (JP); Makoto Oikawa, Yokohama (JP); Ryo Abe, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 509 days.

(21) Appl. No.: 16/662,491

(22) Filed: Oct. 24, 2019

(65) Prior Publication Data

US 2020/0136528 A1 Apr. 30, 2020

(30) Foreign Application Priority Data

Oct. 31, 2018 (JP) .............................. JP2018-204859

(51) Int. Cl.
*H02N 2/00* (2006.01)
*H04N 5/225* (2006.01)
*G02B 7/04* (2021.01)
*G03B 13/34* (2021.01)
*H02N 2/02* (2006.01)

(52) U.S. Cl.
CPC ............. *H02N 2/006* (2013.01); *G02B 7/04* (2013.01); *G03B 13/34* (2013.01); *H02N 2/0065* (2013.01); *H02N 2/026* (2013.01); *H04N 5/2253* (2013.01)

(58) Field of Classification Search
CPC ...... H02N 2/147; H02N 2/126; H02N 2/0075; H02N 2/005; H02N 2/14; H02N 2/145; G02B 7/09; G02B 7/08
See application file for complete search history.

(56) References Cited

U.S. PATENT DOCUMENTS 8,760,036 B2 * 6/2014 Kojima ................. H02N 2/026
310/323.16
2019/0393807 A1 * 12/2019 Oikawa ................. H02N 2/026

FOREIGN PATENT DOCUMENTS

JP 2015-220911 A 12/2019

* cited by examiner

*Primary Examiner* — Emily P Pham
(74) *Attorney, Agent, or Firm* — Cowan, Liebowitz & Latman, P.C.

(57) ABSTRACT

Provided is a vibration wave motor including: a vibrator; a friction member configured to be brought into frictional contact with the vibrator; a first holding member holding the vibrator; a second holding member holding the first holding member; and a third holding member holding the second holding member, wherein the vibrator and the friction member move relative to each other, and wherein one side of the second holding member is configured to connect to the first holding member or the third holding member at a position where the second holding member overlaps the rectangular shape portion in a direction of the relative movement, and another side of the second holding member is configured to connect to the first holding member or the third holding member at a position where the second holding member overlaps the rectangular shape portion in a direction perpendicular to the direction of the relative movement.

12 Claims, 4 Drawing Sheets

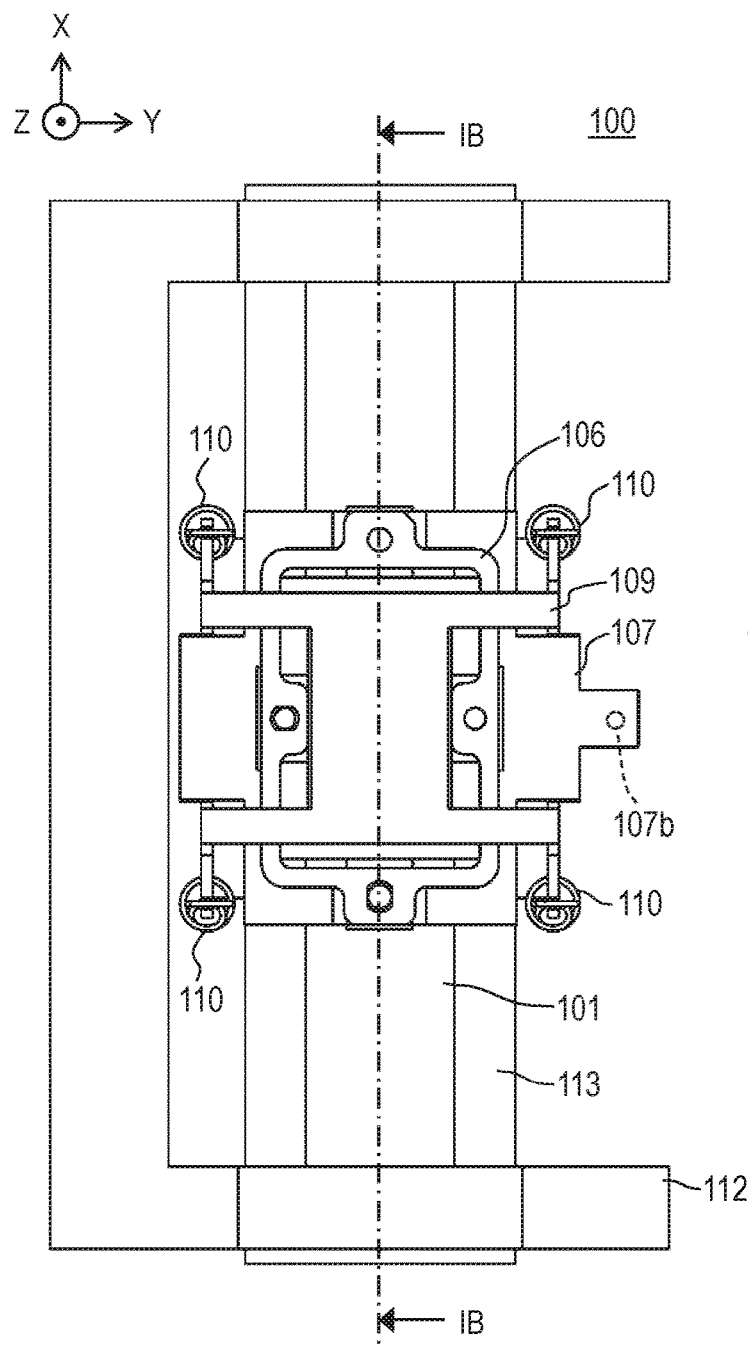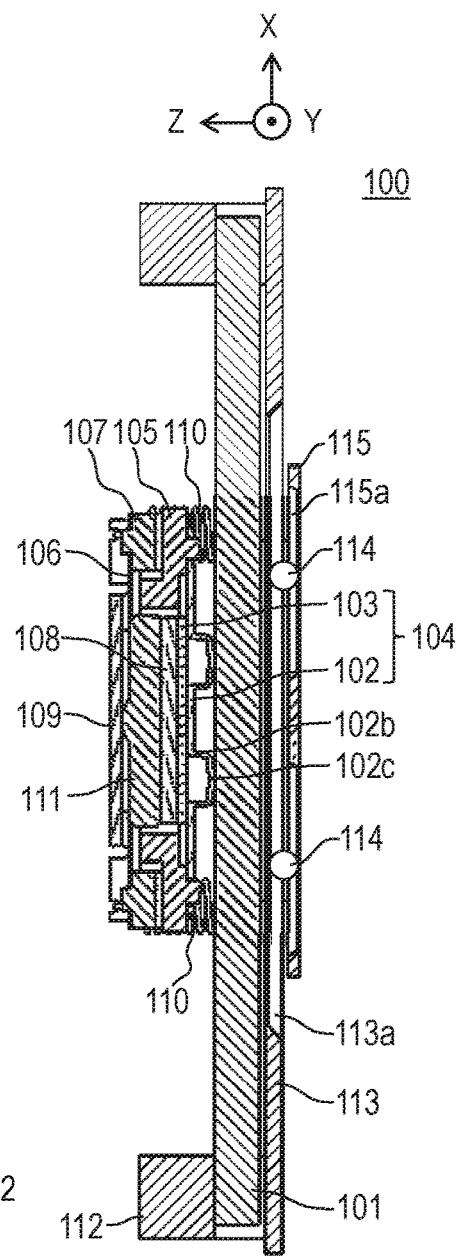

FIG. 2A
FIG. 2B
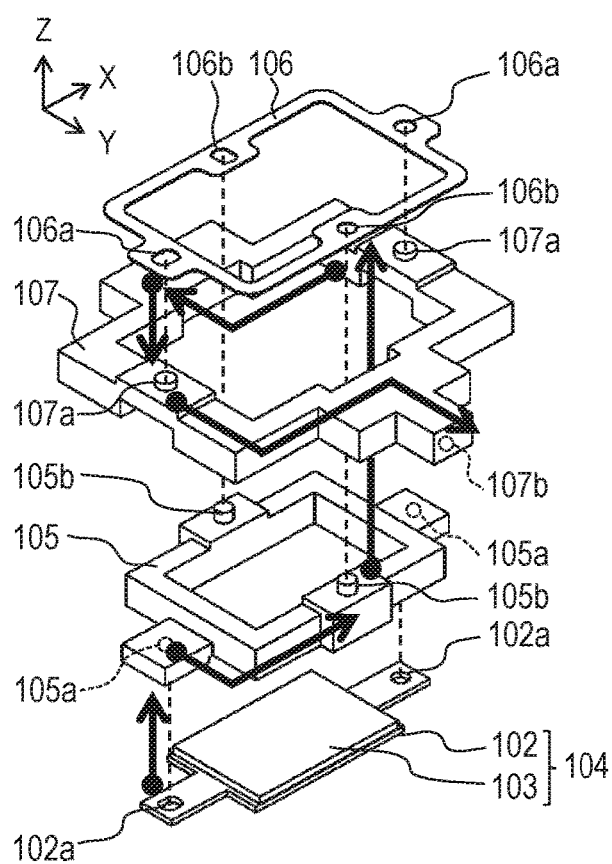
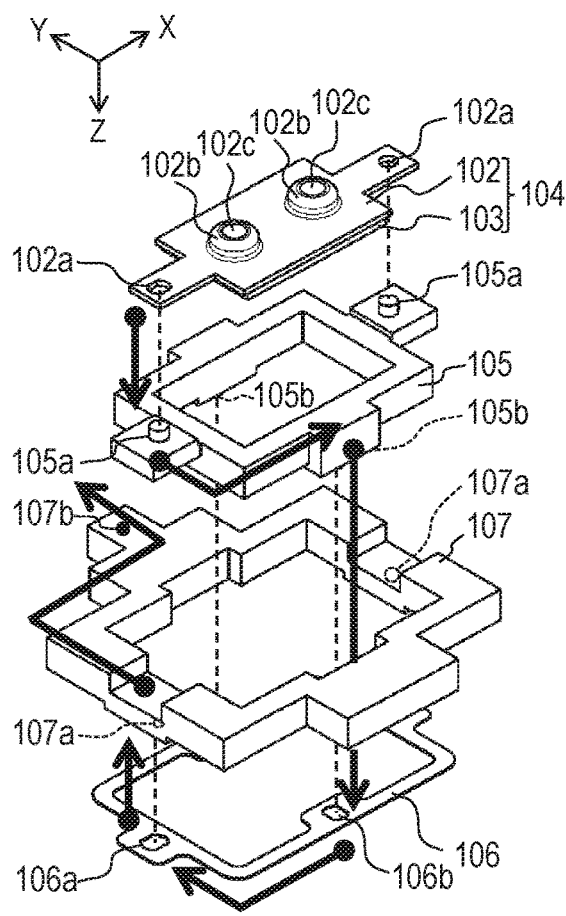

VIBRATION WAVE MOTOR AND DRIVING DEVICE INCLUDING THE VIBRATION WAVE MOTOR

BACKGROUND OF THE INVENTION

Field of the Invention

The present disclosure relates to a vibration wave motor and a driving device including the vibration wave motor.

Description of the Related Art

In an ultrasonic motor, there is adopted a configuration for exerting a driving force in a driving direction without chattering and without inhibiting vibration of a vibrator as a driving source. For example, in Japanese Patent Application Laid-Open No. 2015-220911, there is disclosed an ultrasonic motor configured in such a manner that one of holding members as constituent members for holding a vibrator has high rigidity in a driving direction of the vibrator and has low rigidity in a pressing direction of the vibrator, to thereby eliminate chattering.

However, in the related art disclosed in Japanese Patent Application Laid-Open No. 2015-220911, the ultrasonic motor is downsized, and hence a connection distance from the vibrator to a member that exerts the driving force is short. For that reason, the vibration from the vibrator is liable to propagate to respective members of the ultrasonic motor, and abnormal noise is liable to cause therein. Moreover, the vibration is liable to propagate to a driven member (for example, a lens barrel member) to which the member for exerting the driving force is to be connected, and abnormal noise due to resonance is also liable to cause in the driven member.

SUMMARY OF THE INVENTION

An object of the present disclosure is to provide a vibration wave motor in which an occurrence of unnecessary vibration is reduced.

According to at least one embodiment of the present disclosure, there is provided a vibration wave motor includes: a vibrator including a piezoelectric element and a vibrating plate and having a rectangular shape portion; a friction member configured to be brought into frictional contact with the vibrator; a first holding member configured to hold the vibrator; a second holding member configured to hold the first holding member; and a third holding member configured to hold the second holding member, wherein the vibrator and the friction member are configured to move relative to each other, and wherein one side of the second holding member is configured to connect to the first holding member or the third holding member at a position where the second holding member overlaps the rectangular shape portion in a direction of the relative movement, and another side of the second holding member is configured to connect to the first holding member or the third holding member at a position where the second holding member overlaps the rectangular shape portion in a direction perpendicular to the direction of the relative movement.

According to the present disclosure, there can be provided the vibration wave motor in which the occurrence of unnecessary vibration is reduced.

Further features of the present invention will become apparent from the following description of exemplary embodiments with reference to the attached drawings.

BRIEF DESCRIPTION OF THE DRAWINGS

FIG. 1A is a plan view of a vibration wave motor (100).

FIG. 1B is a cross-sectional view of the vibration wave motor (100).

FIG. 2A and FIG. 2B are exploded perspective views each for illustrating a configuration of holding a vibrator (104) of the vibration wave motor (100).

DESCRIPTION OF THE EMBODIMENTS

Figure 3A:
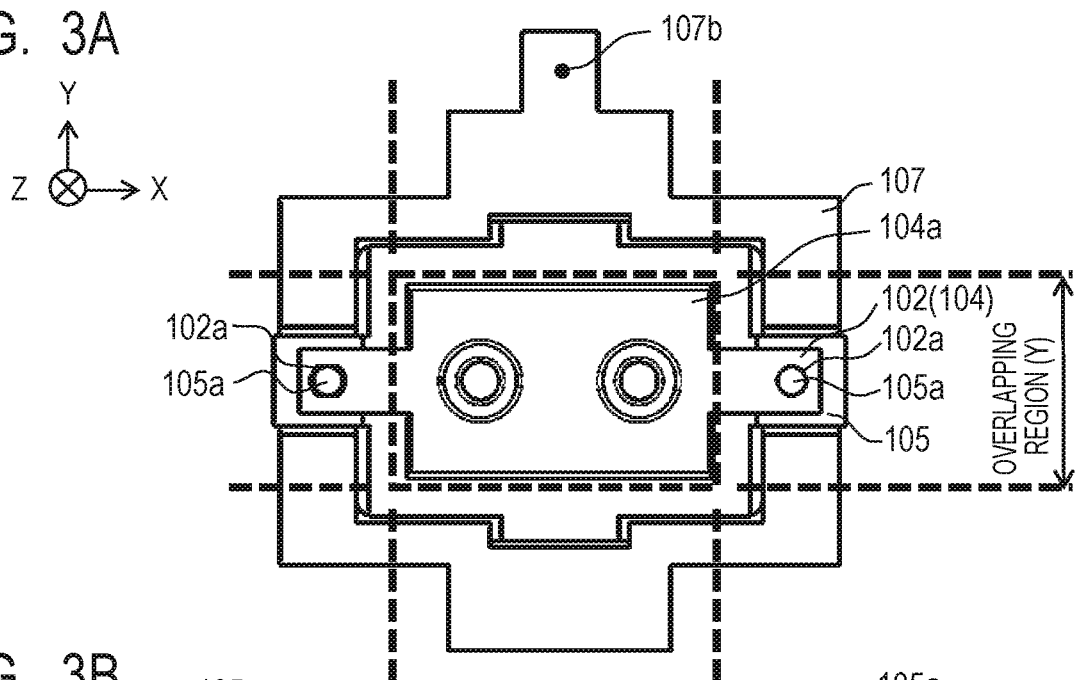
FIG. 3A to FIG. 3C are views each for illustrating connection position relationships between the vibrator (104) and respective members.

Embodiment will now be described in detail in accordance with the accompanying drawings.

EMBODIMENT

In the present specification, a direction, in which a vibrator 104 and a friction member 101 described later are configured to move relative to each other, is defined as an X-axis direction. Moreover, a pressurizing direction by springs 110 described later is defined as a Z-axis direction. Furthermore, a direction perpendicular to the X-axis direction and the Z-axis direction is defined as a Y-axis direction.

FIG. 1A is a plan view for illustrating a vibration wave motor 100 (ultrasonic motor) of an embodiment of the present disclosure when viewed in the Z-axis direction. FIG. 1B is a cross-sectional view for illustrating the vibration wave motor 100 taken along a cross-sectional line IB-IB illustrated in FIG. 1A. The vibration wave motor 100 in this embodiment includes a vibrator 104, a friction member 101, a first holding member 105, a second holding member 106, and a third holding member 107.

The vibrator 104 includes an elastic vibrating plate 102 and a piezoelectric element 103. The vibrating plate 102 and the piezoelectric element 103 are fixed and attached to each other by, for example, a well-known adhesive, and the piezoelectric element 103 is applied with a voltage to excite vibration (ultrasonic vibration) at a frequency of an ultrasonic range.

The friction member 101 is fixed to a fixed frame member 112 together with a fixed-side rail member 113 by a well-known technique such as screws. The friction member 101, the fixed frame member 112, and the fixed-side rail member 113 form a fixed unit.

The vibrating plate 102 includes protrusions 102*b*, apexes of the protrusions 102*b* are provided with contact portions 102*c*, and the contact portions 102*c* are in contact with the friction member 101 under a state of being pressurized and urged by pressurizing force of the springs 110 described later. When the piezoelectric element 103 is applied with a driving voltage, ultrasonic vibration is excited therein, and a resonance phenomenon is caused in the vibrator 104. At this time, two types of standing waves are generated in the vibrator 104, and substantially elliptic motions occur in the contact portions 102*c* of the vibrating plate 102. In a contact state in which the vibrating plate 102 is pressurized against and the contact portions 102*c* are held in contact with the friction member 101, the substantially elliptic motions generated in the vibrator 104 are efficiently transmitted to the friction member 101, and the vibrator 104 and the friction member 101 are configured to move relative to each other.

The springs 110 provided at four points are configured to couple a pressurizing plate 109 and a movable-side rail member 115 to each other, and to give pressurizing force to bring the vibrator 104 into frictional contact with the friction member 101. The pressurizing plate 109 is in contact with an attaching member 111 for attaching an elastic member 108, and is configured to transmit the pressurizing force to the vibrator 104. The elastic member 108 is disposed between the attaching member 111 and the piezoelectric element 103. The attaching member 111 and the elastic member 108 interrupt direct contact between the pressurizing plate 109 and the piezoelectric element 103, and prevent damage of the piezoelectric element 103. The elastic member 108, the pressurizing plate 109, the springs 110, the attaching member 111, and the movable-side rail member 115 form a pressurizing mechanism.

The vibrator 104 and the first holding member 105 are fixed to each other by, for example, a well-known adhesive. However, a fixing method for this case is not limited as long as both thereof are fixed to each other. More specifically, the vibrator 104 is directly held by the first holding member 105. Moreover, the first holding member 105 is directly held by the second holding member 106, and the second holding member 106 is directly held by the third holding member 107. Then, the first holding member 105 is coupled to the third holding member 107 through intermediation of the second holding member 106 formed of a thin metal sheet.

The second holding member 106 and the movable-side rail member 115 are fixed to each other by, for example, screws (not shown). However, a fixing method for this case is not limited as long as both thereof are fixed to each other. The movable-side rail member 115 includes two movable-side guide portions 15*a* having a V-groove shape, and rolling balls 114 are disposed on the respective movable-side rail portions 115*a*. Meanwhile, fixed-side guide portions 113*a* each having a V-groove shape are provided also on the fixed-side rail member 113 facing the movable-side rail member 115. The rolling balls 114 are sandwiched by the fixed-side guide portions 113*a* provided on the fixed-side rail member 113 and the movable-side guide portions 115*a* provided on the movable-side rail member 115. With this configuration, a movement of a movable unit described later in the X-axis direction is guided. The fixed-side rail member 113, the rolling balls 114 and the movable-side rail member 115 form a guide mechanism.

The third holding member 107 includes a connecting portion 107*b* as an output portion configured to output a driving force of the vibration wave motor 100. At this connecting portion 107*b*, the third holding member 107 is connected to a driven member (for example, an optical lens 3 described later).

The pressurizing mechanism and components ranging from the first holding member 105 configured to connect to the vibrator 104 to the third holding member 107 form the movable unit integrally with one another. The movable unit is guided in the X-axis direction by the guide mechanism, and moves relative to the fixed unit. Then, the driven member to be connected to the third holding member 107 becomes movable in the X-axis direction together with the movable unit. Moreover, the vibrator 104, the first holding member 105, the second holding member 106, and the third holding member 107 are arranged so as to overlap one another when viewed in the pressurizing direction through the pressurization and the urging.

FIG. 2A and FIG. 2B are exploded perspective views each for illustrating a configuration of holding the vibrator 104 of the present disclosure. Bold arrows shown in FIG. 2A and FIG. 2B indicate a transmission path of an unnecessary vibration generated in the vibrator 104. In FIG. 2A and FIG. 2B, viewpoints thereof in the Z-axis direction are different by 180 degrees from each other. The configuration of holding the vibrator 104 will be described in detail below.

As illustrated in FIG. 2B, protrusion-shaped first connecting protrusions 105*a* formed on the first holding member 105 are fitted to hole-shaped connecting holes 102*a* formed in the vibrating plate 102, and hence the vibrator 104 is connected to the first holding member 105. Then, hole-shaped second connecting holes 106*b* formed in the second holding member 106 are fitted to protrusion-shaped second connecting protrusions 105*b* formed on a back side of a side on which the first connecting protrusions 105*a* configured to connect to the vibrator 104 are formed. By this fitting, the first holding member 105 is connected to the second holding member 106 as illustrated in FIG. 2A. More specifically, the first holding member 105 includes the first connecting protrusions 105*a* on one side in a direction (Z-axis direction) perpendicular to a direction of the relative movement, and includes the second connecting protrusions 105*b* on the another side (back side) therein. Moreover, with regard to the first connecting protrusions 105*a* and the second connecting protrusions 105*b*, not only the arranged sides thereof in the Z-axis direction are different from each other, but also a pair of the first connecting protrusions 105*a* are arranged along the X-axis direction, and a pair of the second connecting protrusions 105*b* are arranged along the Y-axis direction.

Furthermore, protrusion-shaped connecting protrusions 107*a* formed on the third holding member 107 are fitted to hole-shaped first connecting holes 106*a* formed in the second holding member 106, and hence the second holding member 106 is connected to the third holding member 107. Then, at the connecting portion 107*b* formed on a back side of a side on which the connecting protrusions 107*a* configured to connect to the second holding member 106 are formed, the third holding member 107 is connected to the driven member (for example, the optical lens 3). More specifically, the third holding member 107 includes the connecting protrusions 107*a* on one side in the direction (Z-axis direction) perpendicular to the relative movement direction, and includes the connecting portion 107*b* on the another side (back side) therein. Moreover, a pair of the connecting protrusions 107*a* are arranged along the X-axis direction.

The bold arrows shown in FIG. 2A and FIG. 2B schematically illustrate the transmission path of the unnecessary vibration transmitted from the vibrator 104. Herein, when attention is paid to the transmission path of the vibration in the respective members to which the unnecessary vibration is transmitted, the transmission path connects to one of connected members, which is always to be connected to the member in a vicinity of an end thereof in the X-axis direction as the relative movement direction, and connects to the another connected member in a vicinity of an end thereof in the Y-axis direction perpendicular to the Z-axis direction. With such a configuration, the transmission path of the vibration can be lengthened without enlarging, in an X-Y plane, a configuration that ranges from the vibrator 104 to the third holding member 107.

Moreover, the second holding member 106 is an elastic member formed of a thin metal sheet member, is formed so that a thickness thereof in the Z-axis direction is thin, and has a shape extending in an X-Y plane direction. Then, the second holding member 106 has characteristics in which rigidity thereof in the pressurizing direction by the pressurization and the urging is lower than rigidity thereof in the relative movement direction. With this configuration, with respect to the Z-axis direction as the pressurizing direction, a relative movement between the first holding member 105 and the third holding member 107 is achieved without load, and in the X-Y plane, the first holding member 105 and the third holding member 107 can be connected to each other without chattering.

Moreover, each of the first holding member 105 and the third holding member 107 is a resin member formed of a resin material, and has an action to damp vibration, and accordingly, has a large damping effect for the unnecessary vibration transmitted from the vibrator 104. Further, when attention is paid to the disposition of the first connecting protrusions 105a and the second connecting protrusions 105b, which are provided in the first holding member 105, connection positions thereof are reverse to each other in the Z-axis direction. Moreover, the same also applies to the third holding member 107, and in terms of arrangement, the connecting protrusions 107a and the connecting portion 107b are arranged to be reverse to each other in the Z-axis direction. With such a configuration, the transmission path of the vibration can be further lengthened, and the damping effect for the vibration can be further enhanced.

Figure 3B:
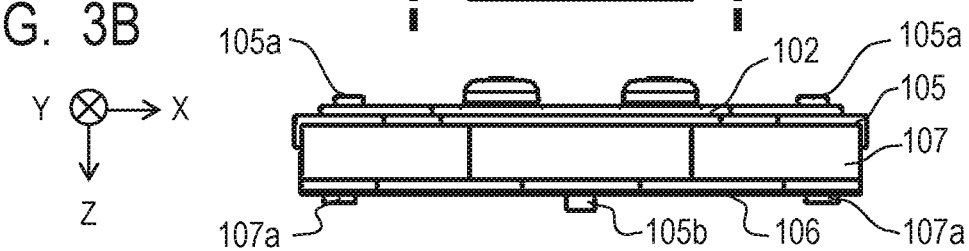
Figure 3C:
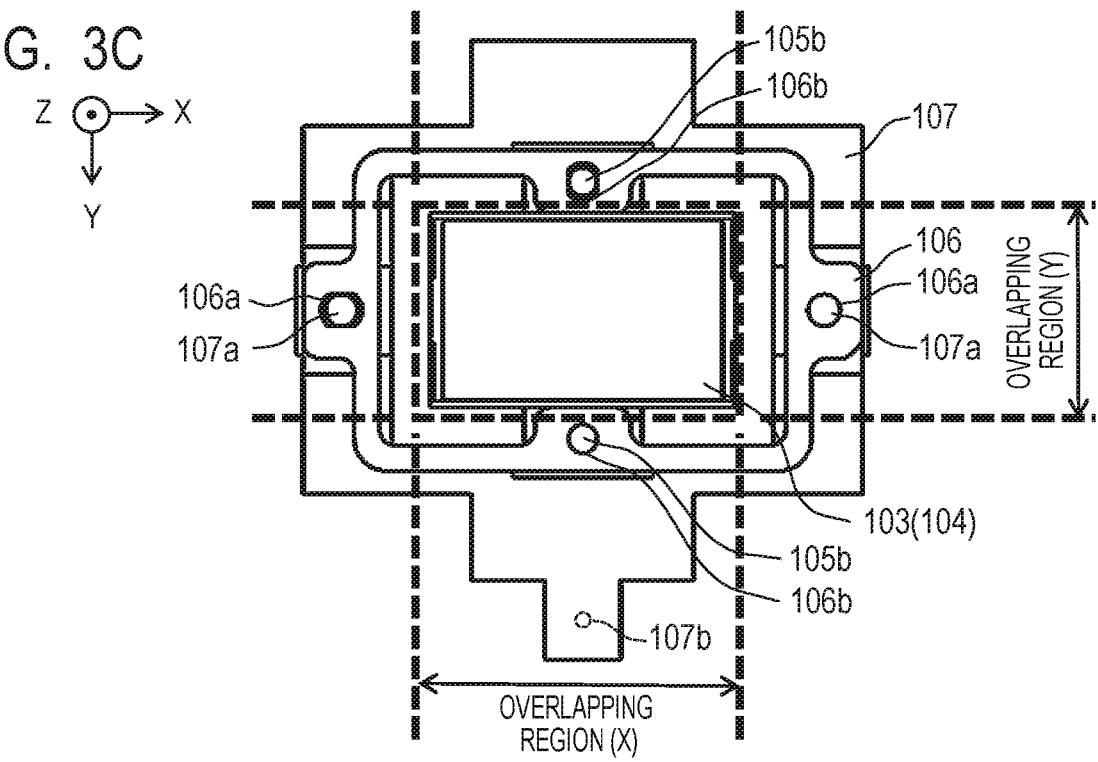

FIG. 3A to FIG. 3C each illustrate disposition relationships between the vibrator 104 and the connection positions of the respective members described with reference to FIG. 2A and FIG. 2B. FIG. 3A is a bottom view, FIG. 3B is a front view, and FIG. 3C is a top view. The vibrator 104 has a rectangular shape portion 104a. For example, the rectangular shape portion 104a may have a shape of the piezoelectric element 103, or may have a shape of a portion of the vibrating plate 102, to which the piezoelectric element 103 is to be fixed and attached. Hereinafter, with regard to the rectangular shape portion 104a of the vibrator 104 and the above-mentioned respective connecting portions, overlapping relationships between positions thereof in the X-axis direction as the relative movement direction and the Y-axis direction perpendicular to the relative movement direction will be described.

Referring to FIG. 3A, the connecting holes 102a of the vibrating plate 102 and the first connecting protrusions 105a of the first holding member 105 are each disposed along the X-axis direction as the relative movement direction, and are each located within an overlapping region (Y). Next, referring to FIG. 3C, the second connecting protrusions 105b of the first holding member 105 and the second connecting holes 106b of the second holding member 106 are each disposed along the Y-axis direction as a direction perpendicular to the relative movement direction, and are each located within an overlapping region (X). More specifically, the first connecting protrusions 105a of the first holding member 105 on one side are configured to connect to the connecting holes 102a of the vibrating plate 102 at positions where the first holding member 105 overlaps the rectangular shape portion 104a in the direction perpendicular to the relative movement direction. Moreover, the second connecting protrusions 105b of the first holding member 105 on another side are configured to connect to the second connecting holes 106b of the second holding member 106 at positions where the first holding member 105 overlaps the rectangular shape portion 104a in the relative movement direction. The first connecting protrusions 105a of the first holding member 105 on one side may connect to the connecting holes 102a of the vibrating plate 102 at positions where the first holding member 105 overlaps the rectangular shape portion 104a in the relative movement direction. In this case, the second connecting protrusions 105b of the first holding member 105 on another side is to be connected to the second connecting holes 106b of the second holding member 106 at positions where the first holding member 105 overlaps the rectangular shape portion 104a in the direction perpendicular to the relative movement direction.

Referring to FIG. 3C, the first connecting holes 106a of the second holding member 106 and the connecting protrusions 107a of the third holding member 107 are each arranged along the X-axis direction as the relative movement direction, and are each positioned within the overlapping region (Y). Furthermore, the third holding member 107 and the connecting portion 107b thereof to the driven member are each arranged along the Y-axis direction as the direction perpendicular to the relative movement direction. More specifically, the first connecting holes 106a of the second holding member 106 on one side are configured to connect to the connecting protrusions 107a of the third holding member 107 at positions where the second holding member 106 overlaps the rectangular shape portion 104a in the direction perpendicular to the relative movement direction. Moreover, the second connecting holes 106b of the second holding member 106 on another side are configured to connect to the second connecting protrusions 105b of the first holding member 105 at positions where the second holding member 106 overlaps the rectangular shape portion 104a in the relative movement direction. The first connecting holes 106a of the second holding member 106 on one side may connect to the connecting protrusions 107a of the third holding member 107 at positions where the second holding member 106 overlaps the rectangular shape portion 104a in the relative movement direction. In this case, the second connecting holes 106b of the second holding member 106 on another side is to be connected to the second connecting protrusions 105b of the first holding member 105 at positions where the second holding member 106 overlaps the rectangular shape portion 104a in the direction perpendicular to the relative movement direction.

With such a configuration as described above, the transmission path of the vibration can be lengthened, the damping effect for the vibration can be further enhanced, and the vibration wave motor 100 in which an occurrence of the unnecessary vibration is reduced while being small in size can be achieved. As in the above-described embodiment, the damping effect for the vibration can be further enhanced by coupling the first holding member 105, the second holding member 106, the third holding member 107, and the driven member to one another. However, only a part of such a coupling structure can enhance the damping effect for the vibration. For example, only a coupling structure of the first holding member 105, the second holding member 106, and the third holding member 107 can enhance the damping effect for the vibration, and only a coupling structure of the second holding member 106, the third holding member 107, and the driven member can enhance the damping effect for the vibration. The exemplary embodiment of the present disclosure has been described above. However, the present disclosure is not limited to this embodiment, and can be modified and altered in various ways within the scope of the spirit thereof.

Application Example

Figure 4:
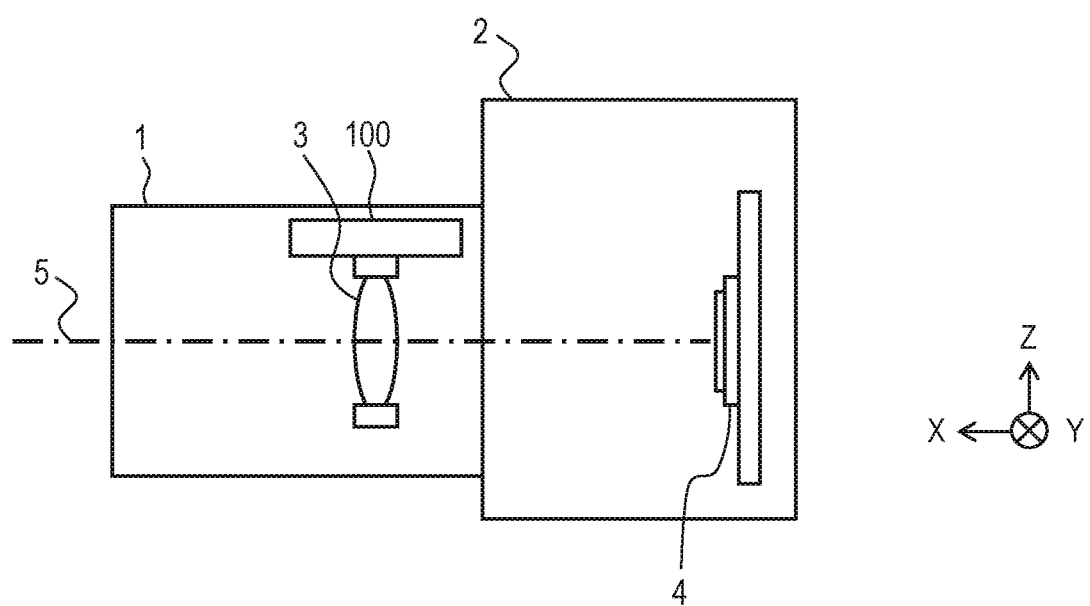
FIG. 4 is a schematic view for illustrating a configuration of an image pickup apparatus to which the vibration wave motor (100) is applied.

FIG. 4 is a view for illustrating a configuration of an image pickup apparatus as an application example to which the vibration wave motor 100 of the present disclosure is applied. In this specification, a case will be described in which a lens barrel driving device equipped with the vibration wave motor 100 is mounted on the image pickup apparatus. However, this does not limit the present disclosure. Moreover, an image pickup apparatus, in which an image pickup lens unit 1 and a camera body 2 described later are integrated with each other, will be described. However, the image pickup lens unit 1 may be an exchangeable lens.

In FIG. 4, the image pickup lens unit 1 and the camera body 2 form an image pickup apparatus body. In the inside of the image pickup lens unit 1, the optical lens 3 is coupled to the connecting portion 107b of the third holding member 107 of the vibration wave motor 100, and the vibrator 104 that forms the vibration wave motor 100 moves, and hence the optical lens 3 is guided in substantially the same direction as the relative movement direction. More specifically, the optical lens 3 becomes movable in a substantially parallel direction to an optical axis 5. The vibration wave motor 100 and a lens barrel including the optical lens 3 formed of lenses and a lens holding frame form the lens barrel driving device to which the vibration wave motor 100 of the present disclosure is applied. In the lens barrel driving device in which the optical lens 3 is a focusing lens, the focusing lens is moved in the substantially parallel direction to the optical axis 5 at a time of photographing an image, a subject image can be formed on a position of an image pickup element 4, and a focused image can be generated.

In the vibration wave motor 100 of the present disclosure, the occurrence of the unnecessary vibration is reduced while being small in size. Therefore, application of this vibration wave motor 100 can provide a lens barrel driving device, which hardly causes a noise. The above-described application example applies the vibration wave motor 100 of the present disclosure to such a lens driving device that defines the optical lens 3 as the driven member. However, a driving device configured to drive the driven member by using the vibration wave motor 100 of the present disclosure is not limited to the lens driving device. For example, the driving device may be a driving device that defines a holding frame, which is configured to hold the image pickup element 4, as the driven member, and is configured to drive the image pickup element 4 by using the vibration wave motor 100 of the present disclosure, or may be a driving device configured to drive other driven members by using the vibration wave motor 100 of the present disclosure. Moreover, a coupling structure of coupling the driven member and the vibration wave motor 100 to each other is not limited to the above-described structure, and a structure of coupling the third holding member 107 and the driven member to each other may be used in accordance with a shape of the driven member.

While the present invention has been described with reference to exemplary embodiments, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2018-204859, filed Oct. 31, 2018, which is hereby incorporated by reference herein in its entirety.

What is claimed is:
1. A vibration wave motor comprising:
a vibrator including a piezoelectric element and a vibrating plate and having a rectangular shape portion;
a friction member configured to be brought into frictional contact with the vibrator;
a first holding member configured to hold the vibrator;
a second holding member configured to hold the first holding member; and
a third holding member configured to hold the second holding member,
wherein the vibrator and the friction member are configured to move relative to each other, and
wherein one side of the second holding member is configured to connect to the first holding member or the third holding member at a position where the second holding member overlaps the rectangular shape portion in a direction of the relative movement, and another side of the second holding member is configured to connect to the first holding member or the third holding member at a position where the second holding member overlaps the rectangular shape portion in a direction perpendicular to the direction of the relative movement.

2. A vibration wave motor comprising:
a vibrator including a piezoelectric element and a vibrating plate and having a rectangular shape portion;
a friction member configured to be brought into frictional contact with the vibrator;
a first holding member configured to hold the vibrator;
a second holding member configured to hold the first holding member; and
a third holding member configured to hold the second holding member,
wherein the vibrator and the friction member are configured to move relative to each other, and
wherein the third holding member is configured to connect to the second holding member on one side in a direction perpendicular to a direction of the relative movement, and on another side, to connect to a member to be driven.

3. The vibration wave motor according to claim 1,
wherein the third holding member is configured to connect to the second holding member on one side in the direction perpendicular to the direction of the relative movement, and on another side, to connect to a member to be driven.

4. The vibration wave motor according to claim 1,
wherein one side of the first holding member is configured to connect to the vibrator or the second holding member at a position where the first holding member overlaps the rectangular shape portion in a direction of the relative movement, and another side of the first holding member is configured to connect to the vibrator or the second holding member at a position where the first holding member overlaps the rectangular shape portion in the direction perpendicular to the direction of the relative movement.

5. The vibration wave motor according to claim 1,
wherein the first holding member is configured to connect to the vibrator on one side in the direction perpendicular to the direction of the relative movement, and on another side, to connect to the second holding member.

6. The vibration wave motor according to claim 1,
wherein the first holding member and the third holding member are composed of members configured to highly damp vibration.

7. The vibration wave motor according to claim 1,
wherein the vibrator and the friction member are pressurized and urged in the direction perpendicular to the direction of the relative movement, and
the second holding member is an elastic member in which rigidity in a pressurizing direction by the pressurization and the urging is lower than rigidity in the direction of the relative movement.

8. The vibration wave motor according to claim 1,
wherein the vibrator and the friction member are pressurized and urged in the direction perpendicular to the direction of the relative movement, and
the vibrator, the first holding member, the second holding member, and the third holding member are disposed so as to overlap one another when viewed in the pressurizing direction by the pressurization and the urging.

9. The vibration wave motor according to claim 1,
wherein the vibration wave motor is an ultrasonic motor configured to vibrate at a frequency in an ultrasonic range.

10. A driving device comprising:
a vibrator including a piezoelectric element and a vibrating plate and having a rectangular shape portion;
a friction member configured to be brought into frictional contact with the vibrator;
a first holding member configured to hold the vibrator;
a second holding member configured to hold the first holding member; and
a third holding member configured to hold the second holding member,
wherein the vibrator and the friction member are configured to move relative to each other,
wherein the driving device includes a driven member to be driven by a vibration wave motor in which one side of the second holding member is configured to connect to the first holding member or the third holding member at a position where the second holding member overlaps the rectangular shape portion in a direction of the relative movement, and another side of the second holding member is configured to connect to the first holding member or the third holding member at a position where the second holding member overlaps the rectangular shape portion in a direction perpendicular to the direction of the relative movement,
wherein the driven member is guided in substantially a same direction as the direction of the relative movement, and
wherein the third holding member is configured to connect to the second holding member on one side in the direction perpendicular to the direction of the relative movement, and on another side, to connect to the driven member.

11. The driving device according to claim 10, wherein the driven member is an optical lens.

12. The driving device according to claim 10, wherein the driven member is a holding frame configured to hold an image pickup element.

* * * * *